(12) United States Patent
Sundholm

(10) Patent No.: US 9,434,542 B2
(45) Date of Patent: Sep. 6, 2016

(54) METHOD AND APPARATUS FOR HANDLING MATERIAL IN A PNEUMATIC MATERIALS HANDLING SYSTEM

(71) Applicant: MARICAP OY, Vantaa (FI)

(72) Inventor: Göran Sundholm, Tuusula (FI)

(73) Assignee: MARICAP OY, Vantaa (FI)

( * ) Notice: Subject to any disclaimer, the term of this patent is extended or adjusted under 35 U.S.C. 154(b) by 0 days.

(21) Appl. No.: 14/399,470

(22) PCT Filed: Apr. 26, 2013

(86) PCT No.: PCT/FI2013/050472
§ 371 (c)(1),
(2) Date: Nov. 6, 2014

(87) PCT Pub. No.: WO2013/167797
PCT Pub. Date: Nov. 14, 2013

(65) Prior Publication Data
US 2015/0117967 A1 Apr. 30, 2015

(30) Foreign Application Priority Data
May 7, 2012 (FI) ..................................... 20125491

(51) Int. Cl.
*B65G 53/46* (2006.01)
*B65F 5/00* (2006.01)
*B65G 53/24* (2006.01)

(52) U.S. Cl.
CPC .............. *B65F 5/005* (2013.01); *B65G 53/24* (2013.01)

(58) Field of Classification Search
USPC .......... 406/130, 151, 197; 264/310; 425/447
See application file for complete search history.

(56) References Cited

U.S. PATENT DOCUMENTS

| | | | | | |
|---|---|---|---|---|---|
| 3,270,921 | A | * | 9/1966 | Nadolske | B60P 3/224 222/132 |
| 3,583,770 | A | * | 6/1971 | Medhammar | B65G 53/64 100/215 |
| 3,653,720 | A | * | 4/1972 | Craig | B65F 5/005 406/130 |
| 3,888,188 | A | * | 6/1975 | Fuller | B61D 7/26 105/252.1 |

(Continued)

FOREIGN PATENT DOCUMENTS

| | | |
|---|---|---|
| JP | 54-079780 U | 6/1979 |
| WO | WO 82/03200 A1 | 9/1982 |

(Continued)

*Primary Examiner* — Joseph Dillon, Jr.
(74) *Attorney, Agent, or Firm* — Birch, Stewart, Kolasch & Birch, LLP

(57) ABSTRACT

Method for feeding material into a shaping device in a pneumatic materials conveying system, in which method material, such as waste material is fed into a shaping device, and/or through it, in a feeder channel by the aid of at least partly gravity and at least partly suction and/or a pressure difference, which shaping device is a rotary shaper, with which the material is processed so as to be denser and is conveyed onwards. In the material infeed direction before the rotary shaper is a movable arresting device, which arresting device has a first position, in which it extends into the feeder channel and in which first position the arresting device receives at least some of the force effect produced by the material in the feeder channel and in which the transfer of the material in the feeder channel is limited, if necessary, with the arresting device, and which arresting device has a second position, in which the arresting device does not extend into the feeder channel.

20 Claims, 1 Drawing Sheet

(56) References Cited

U.S. PATENT DOCUMENTS

| | | | | |
|---|---|---|---|---|
| 3,933,393 A * | 1/1976 | De Feudis | ............... | B65F 5/005 406/130 |
| 3,948,167 A | 4/1976 | De Feudis | | |
| 4,019,783 A * | 4/1977 | Kayser | ............... | B65G 53/14 406/130 |
| 4,074,921 A * | 2/1978 | de Feudis | ............... | B65G 51/02 406/119 |
| 4,099,457 A * | 7/1978 | Hyden | ............... | B65F 5/005 100/215 |
| 4,108,498 A * | 8/1978 | Bentsen | ............... | B65F 5/005 137/614.21 |
| 4,423,988 A * | 1/1984 | Cote | ............... | B65D 90/587 220/211 |
| 4,589,592 A * | 5/1986 | Wassdahl | ............... | B65G 53/24 232/43.1 |
| 4,695,207 A * | 9/1987 | Miller | ............... | B65D 90/66 105/299 |
| 4,699,548 A * | 10/1987 | Bergstrom | ............... | B65G 53/30 406/109 |
| 4,784,533 A * | 11/1988 | Teigen | ............... | B01J 8/003 110/245 |
| 5,333,146 A * | 7/1994 | Vance | ............... | F23G 5/085 110/250 |
| 5,775,852 A * | 7/1998 | Boutte | ............... | B65G 47/19 406/120 |
| 6,224,297 B1 * | 5/2001 | McCann | ............... | B65G 53/525 406/105 |
| 6,412,422 B2 * | 7/2002 | Dohr | ............... | B61D 7/20 105/282.1 |
| 7,743,717 B2 * | 6/2010 | Vera | ............... | F23G 5/444 100/41 |
| 8,899,885 B2 * | 12/2014 | Sundholm | ............... | B65F 5/005 406/52 |
| 9,139,362 B2 * | 9/2015 | Sundholm | ............... | B65F 5/005 |
| 9,156,612 B2 * | 10/2015 | Sundholm | ............... | B65F 5/005 |
| 2011/0013994 A1 * | 1/2011 | Sundholm | ............... | B65F 5/005 406/154 |
| 2012/0308313 A1 * | 12/2012 | Sundholm | ............... | B65F 5/005 406/70 |
| 2012/0308314 A1 * | 12/2012 | Sundholm | ............... | B65F 5/005 406/113 |
| 2012/0319327 A1 * | 12/2012 | Sundholm | ............... | B65F 5/005 264/310 |
| 2015/0117965 A1 * | 4/2015 | Sundholm | ............... | B65G 51/02 406/50 |
| 2015/0191308 A1 * | 7/2015 | Sundholm | ............... | B65F 1/105 414/404 |
| 2015/0232271 A1 * | 8/2015 | Sundholm | ............... | B65F 3/143 100/90 |
| 2015/0274418 A1 * | 10/2015 | Sundholm | ............... | B65F 1/105 414/293 |
| 2015/0274419 A1 * | 10/2015 | Sundholm | ............... | B65F 1/105 414/293 |
| 2015/0321844 A1 * | 11/2015 | Sundholm | ............... | B65F 5/005 406/135 |
| 2015/0368043 A1 * | 12/2015 | Sundholm | ............... | E04F 17/12 406/122 |
| 2015/0375935 A1 * | 12/2015 | Sundholm | ............... | B65F 5/005 406/151 |
| 2016/0009044 A1 * | 1/2016 | Sundholm | ............... | B65F 5/005 100/39 |

FOREIGN PATENT DOCUMENTS

| | | |
|---|---|---|
| WO | WO 03/057596 A1 | 7/2003 |
| WO | WO 2010/029212 A1 | 3/2010 |
| WO | WO 2011/098666 A1 | 8/2011 |
| WO | WO 2011/098667 A2 | 8/2011 |
| WO | WO 2011/098668 A2 | 8/2011 |
| WO | WO 2011/098669 A2 | 8/2011 |

* cited by examiner

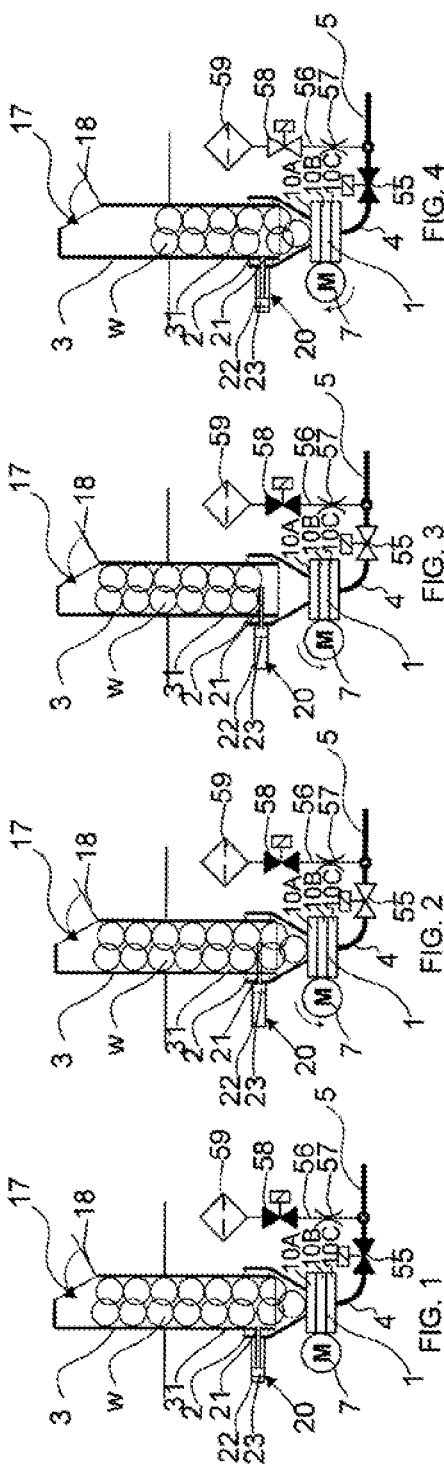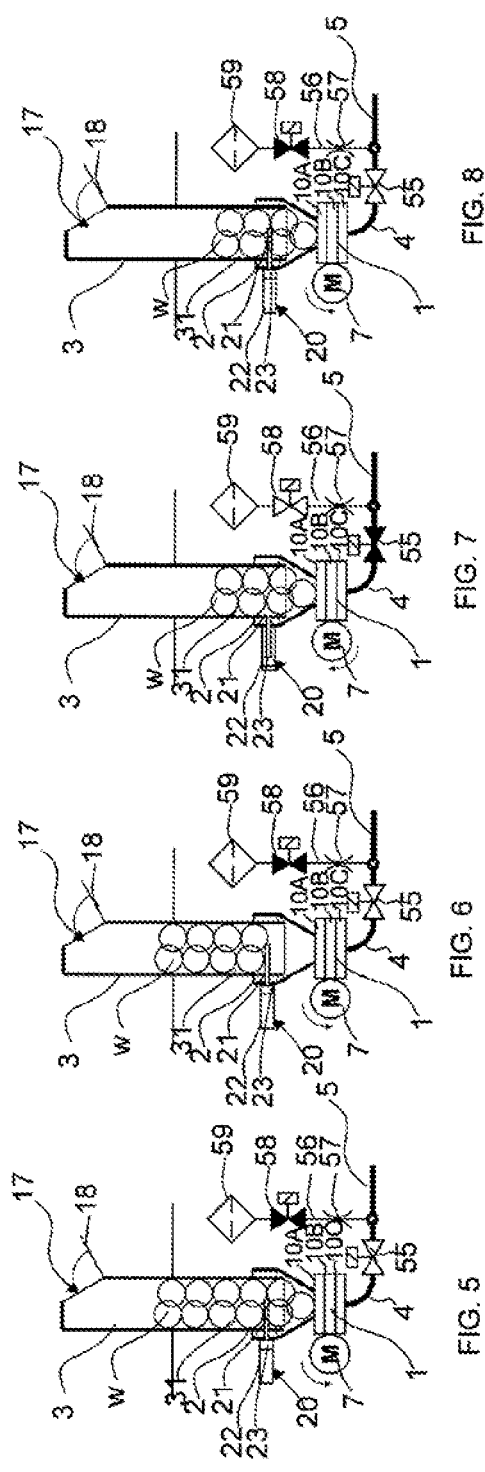

METHOD AND APPARATUS FOR HANDLING MATERIAL IN A PNEUMATIC MATERIALS HANDLING SYSTEM

BACKGROUND OF THE INVENTION

The object of the invention is a method for feeding material into a shaping device in a pneumatic materials conveying system.

Another object of the invention is an apparatus for feeding material into a shaping device in a pneumatic materials conveying system.

The invention relates generally to materials handling systems, such as partial-vacuum conveying systems, more particularly to the collection and conveying of wastes, such as to the conveying of household wastes.

Systems wherein wastes are conveyed in piping by means of an air current produced by a pressure difference or suction are known in the art. In these, wastes are conveyed long distances in the piping. It is typical to these systems that a partial-vacuum apparatus is used to achieve a pressure difference, in which apparatus a partial vacuum is achieved in the conveying pipe with partial-vacuum generators, such as with vacuum pumps or with an ejector apparatus. A conveying pipe typically comprises at least one valve means, by opening and closing which the replacement air coming into the conveying pipe is regulated. Input points at the input end of the material are used in the systems, from which input points the material, such as wastes, is conveyed into the system. The system can also comprise refuse chutes into which material, such as waste material, is fed and from which the material to be conveyed is conveyed into a conveying pipe by opening a discharge valve means, in which case, by means of the sucking effect achieved by the aid of the partial vacuum acting in the conveying pipe and also by means of the surrounding air pressure acting via the refuse chute, material such as e.g. waste material packed into bags, is conveyed from the refuse chute into the conveying pipe. The pneumatic waste conveying systems in question can be utilized particularly well in densely populated urban areas. These types of areas have tall buildings, in which the input of wastes into a pneumatic waste conveying system is performed via a refuse chute or other input point arranged in the building.

A refuse chute is a vertical pipe, preferably comprising a number of input points, which are typically arranged in the wall of the refuse chute at a distance from each other. Tall buildings can comprise many tens, even hundreds, of storeys, in which case the refuse chute forms a very high pipe.

Wastes are conveyed pneumatically in a dosed system to a reception station, in which the wastes are compressed with a press only after transportation. The pipes of a pneumatic conveying system are in normal cases rather large in diameter, e.g. in the region of 500 mm in their diameter.

Publication WO8203200 A1 discloses a device for fine-grinding, compressing and outputting a high-volume bulk good, more particularly household wastes, by means of which device the waste material conducted through the device can be compacted. In the solution according to the publication high operating powers are typically needed, especially in situations in which the device is used to cut or fine-grind a material, in which case the energy consumption of the drive devices and the costs of the drive devices are high. In addition, the passage of stones or other corresponding material between the cutting blades can cause breakage of the blades. Known from publications WO2011098666, WO2011098667, WO2011098668 and WO2011098669 are solutions in which rotary shapers are applied. Sometimes in the upper container, such as in the feeder channel or refuse chute, of a rotary shaper there is a lot of waste material piled up on itself, the force effect produced by which pushes the handling means of the rotary shaper. This requires significant driving force from the drive device of the rotary shaper or it can also slow down the operation of the rotary shaper.

The aim of the present invention is to achieve a new type of solution in connection with feeder channels and rotary shapers, by means of which solution the drawbacks of prior art solutions are avoided.

BRIEF DESCRIPTION OF THE INVENTION

The invention is based on a concept wherein an arresting device is in the feeder channel, such as in the input chute or refuse chute, at a distance before the rotary shaper, which arresting means can be moved between at least two positions, a first position, in which the arresting means is in the feeder channel, in which case the arresting means receives at least some of the force effect produced by the material that is before the arresting means in the material infeed direction, and thereby lightens the force effect being exerted on the rotary shaper by the material in the feeder channel, and a second position, in which the arresting means does not extend into the feeder channel.

The solution according to the invention has a number of important advantages. By means of the invention a particularly efficient solution for the handling, more particularly for the pneumatic pipe transport, of material is achieved. With the solution according to the invention, the infeed of material to be handled can be adjusted in the feeder channel before the rotary shaper, in this case with the arresting means the weight effect produced by the material to be handled on the rotary shaper, more particularly the load acting on its handling means, can be prevented or at least reduced. In this case the power requirement of the rotary shaper is smaller. In addition, the susceptibility to clogging decreases. With the arresting means the infeed of material in the feeder channel can also be boosted. According to one method of use, the arresting means is in the feeder channel when the rotating handling means of the rotary shaper rotate in a first direction, and the arresting means is not in the feeder channel when the handling means of the rotary shaper rotate in a second direction. This is an effective solution particularly for large quantities of waste and for heavy waste sacks. With the solution according to the invention, waste material can be efficiently fed to the rotary shaper and compacted with the rotary shaper, and efficient transportation can be achieved with a significantly smaller pipe size compared to unshaped waste material. By using suction, in addition to gravity, to convey the material to be handled from the rotary shaper into the transport pipe, an advantageous solution for a combination of a rotary shaper and pipe transport is achieved.

BRIEF DESCRIPTION OF THE FIGURES

In the following, the invention will be described in more detail by the aid of an embodiment with reference to the attached drawing, wherein FIGS. 1-8 present an embodiment of the apparatus according to the invention as a simplified diagram, in different operating modes.

DETAILED DESCRIPTION OF THE INVENTION

FIGS. 1-8 present as a simplified diagram one embodiment of the solution according to the invention, in which the rotary shaper device 1 is arranged in connection with a feeder channel, such as a feeder chute, refuse chute or corresponding, with a fitting part 2, which in the figure is conical. The feeder channel is e.g. a tubular part, inside the wall 31 of which remains space for material. The material w, such as household waste, waste paper, cardboard or other waste, is fed e.g. from an input aperture 17 into the feeder channel 3 and from there onwards, via the fitting part 2, into a rotary shaper 1. An openable and closable hatch 18, which is open in the situation of the figure, is in connection with the input aperture in FIG. 1. The material w to be handled is shaped and compacted in the rotary shaper and after handling is conducted via an output coupling 4 into conveying piping 5 by means of the suction and/or a pressure difference produced by e.g. the drive devices (not presented) of a pneumatic pipe transport system. One advantage of the embodiment of the invention is that the waste material is made into a suitable shape, in which it fits for conveyance in transport piping 4, 5. In this case conveying piping 5 that is significantly smaller in diameter can be used. According to one embodiment e.g. a pipe with a diameter in the region of 150-300 mm, preferably in the region of 200 mm, can be used as a conveying pipe 5. In the embodiment of the invention simultaneous suction can be used, in which case the material to be handled can be acted upon with suction or with a pressure difference acting via the conveying pipe 5 and the output coupling 4 when conducting the material through the handling means 10A, 10B, 10C of the rotary shaper 1. The handling means 10A, 10B, 10C are ring-shaped, each of which has an aperture from the first side, from the input side, to the output side. At least some of the handling means are rotated in the embodiment of the figure around a vertical axis with the drive device 7. In the figure the topmost rotatable handling means 10A and the bottommost rotatable handling means 10C are rotated, and between them remains a non-rotating, stationary handling means 10B. Below the rotary shaper 1 in the output coupling 4 is a valve means 55. The valve means 55 opens and closes the connection between the rotary shaper 1 and the conveying pipe 5 and thus with the valve means 55 the suction effect produced by a partial-vacuum generator of the pneumatic waste transport system from the conveying pipe 5 into the rotary shaper 1 is adjusted.

A replacement air coupling 56 is connected to the conveying pipe 5. The replacement air coupling 56 comprises a valve means 58. The replacement air coupling 56 comprises a filtering means 59. The replacement air coupling comprises a choke means 57. The replacement air coupling 56 is arranged in the conveying pipe 5 after the valve means 55 in the conveying direction of the material.

In FIG. 1 material w has been fed into the feeder channel, such as into the input chute 3, from the input aperture 17. In FIG. 1 so much material w has been fed into the input chute 3 that it is almost full. The material w is described in the figures with balls, but it can be material of many types and shapes, such as e.g. household waste material packed into bags.

According to an embodiment of the invention, an arresting device 20 is arranged in the input chute 3 or in the feeder channel before the rotary shaper 1 in the infeed direction of the material vv. The arresting device comprises an arresting means 21 and its drive device 22. The arresting means 21 can be moved between at least two positions, a first position, in which the arresting device extends a distance from the edge of the wall 31 of the input chute 3 or corresponding feeder channel into the input chute (in FIG. 2), preferably essentially across the input chute 3 in the transverse direction with respect to the direction of travel of its material, and a second position (FIG. 1), in which the arresting means 21 does not extend into the input chute 3.

In the first position, i.e. in the active position, the arresting means 21 receives at least some of the force effect produced by the material w that has collected in the input chute 3 or in a corresponding feeder channel before it in the material infeed direction and/or prevents the entrance of some of the material into the rotary shaper. In this case the load exerted by the material, which is in the feeder channel 3 and is intended for handling, on the rotary shaper, on its handling means 10A, 10B 10C, decreases. On the other hand, the arresting means can also prevent the material that is in the feeder channel 3 and is between arresting means 21 and the rotary shaper 1 from rising to above the arresting means in the feeder channel when the arresting means is in the first position.

According to one embodiment the arresting means 21 is an elongated rod-shaped part.

According to one embodiment the drive device 22 of the arresting device 20 is a piston-cylinder combination. The arresting means 21 is arranged on the piston rod of the piston 23 of the drive device 22 or the arresting means 21 is formed, at least partly, from piston rod of the drive device 22.

According to one embodiment the arresting means 21 can be of some other shape, e.g. plate-shaped.

In the situation of FIG. 2 the valve means 55 has been opened and the suction effect of the conveying pipe 5 extends into the rotary shaper and through it into the material to be handled. The handled material displaces through the handling means of the rotary shaper into the conveying pipe 5 and further onwards in the pneumatic pipe transport system for material.

In the situation of FIG. 3 the material, which is between the arresting means and the rotary shaper, has been handled and conveyed into the conveying pipe 5. The arresting means 21 supports on it the material w in the feeder channel, preventing its entry into the rotary shaper.

In FIG. 4 the valve 55 of the conveying pipe has been closed and the arresting means has been shifted into the second position with the drive device 22, in which case the material in the feeder channel is able to go downwards into the rotary shaper under the effect of gravity. In the figure the rotary shaper is being driven in the second direction, which is described by the direction (clockwise in FIG. 4) of the arrow beside the drive device 7 of the rotary shaper.

The rotary shaper 1 is, according to one embodiment, preferably driven in a sequence, which has a certain duration $t_1$, for the extent of which the handling means 10A, 10C are rotated with the drive device 7 in a first direction, after which the direction of rotation is changed. After this the handling means 10A, 10C are rotated in the opposite direction for a second period of time $t_2$. The first direction is the actual handling direction of the shaper. The second direction is that in which the possible blade part of the handling means is configured to cut the material. The rotation duration $t_2$ of the second direction of rotation is typically shorter than the duration $t_1$ of the first direction of rotation. According to one embodiment preferably an equation is followed, according to which $t_2 = 0.5 * t_1$.

Typically the rotation duration $t_1$ of the first handling direction is in the order of 10 seconds and the duration $t_2$ of the opposite direction of rotation is 5 seconds.

When the handling means 10A, 10C are rotated in the opposite direction with respect to the handling direction (e.g. in FIG. 4), the replacement air valve 58 of the replacement air coupling 56 is kept in the open position, in which case material is conveyed in the conveying piping 5 at least from the area of influence of the rotary shaper or from the proximity of it. In this case the arresting means 21 is in the second position, i.e. out of the feeder channel 3.

The ring-shaped handling means 10A, 10B, 10C, or at least some of them, and the inner surface of their apertures are patterned and/or arranged to be such in their shape that their rotational movement simultaneously feeds material onwards from an aperture towards the output end and the output coupling 4 and the conveying pipe 5. Typically at least the rotating handling means WA, 10C are arranged to be such that they convey material towards the output end and the output coupling 4 and the conveying pipe 5.

In FIG. 5 a new sequence is started, which corresponds to the situation of FIG. 2. FIG. 6 presents the situation of FIG. 3 and FIG. 7 the situation of FIG. 4. The situation of FIG. 8 corresponds to the situation of FIG. 2. The amount of material w to be handled decreases in the feeder channel 3 according to the handling phases of FIGS. 2-8.

The rotary shaper thus functions in a way as a re-arranger and compactor (i.e. as a formatter). Under the effect of suction the handling means 10A, 10C of the rotary shaper shape the material to be handled so that it fits into the output aperture and onwards into the conveying pipe 5.

The direction of rotation of the handling means 10A, 10C can be varied. Should too large a load arise, a handling means stops and the direction of rotation is changed. When the load increases to be too large for one of the rotatable handling means, its direction of rotation is changed.

The general operation of a prior-art rotary press is presented e.g. in publications WO8203200, WO2011098666, WO2011098667, WO2011098668 and WO2011098669, and it is not described in more detail in his publication.

The invention thus relates to a method for feeding material into a shaping device in a pneumatic materials conveying system, in which method material, such as waste material, is fed into a shaping device 1, and/or through it, in a feeder channel 3 by the aid of at least partly gravity and at least partly suction and/or a pressure difference, which shaping device 1 is a rotary shaper, with which the material is processed so as to be denser and is conveyed onwards. In the material infeed direction before the rotary shaper 1 is a movable arresting means 21, which arresting means has a first position, in which it extends into the feeder channel 3, and in which first position the arresting means 21 receives at least some of the force effect produced by the material w in the feeder channel 3 and in which the transfer of the material w in the feeder channel 3 is limited, if necessary, with the arresting means 21, and which arresting means 21 has a second position, in which the arresting means 21 does not extend into the feeder channel 3.

According to one embodiment the arresting means 21 is moved between the first position and the second position with a drive device 22.

According to one embodiment at least some of the handling means 10A, 10C of the rotary shaper feed the material to be handled through the handling means when rotating them in the first direction with the drive device 7, in which case the arresting means 21 is in the first position in the feeder channel 3.

According to one embodiment with the arresting means 21 the amount of material being fed to the rotary shaper 1 is limited.

According to one embodiment the direction of rotation of the rotatable handling means 10A, 10C can be varied, in which case when rotating at least some of the handling means 10A, 10C in the second direction, the arresting means 21 is taken into a second position, in which it does not extend into the feeder channel 3.

According to one embodiment the transverse surface area of the arresting means 21 covers some of the transverse surface area of the feeder channel 3 in the material infeed direction.

According to one embodiment the arresting means 21 is an elongated rod-shaped means.

According to one embodiment the pneumatic materials conveying system is a pipe transport system for material, more particularly waste material.

According to one embodiment the rotatable handling means 10A, 10C are driven in sequences, in which case the handling means 10A, 10C are rotated in a first direction for a first amount of time $t_1$ and after that in the opposite direction for a second time $t_2$, in which case the arresting means 21 is in the first position when the rotatable handling means 10A, 10C are rotated in the first direction and the arresting means 21 is in the second position when the rotatable handling means 10A, 10C are rotated in the second direction.

According to one embodiment the arresting means is moved with a drive device 22, which is a pressure-medium-acting cylinder-piston combination, in which the arresting means 21 is moved with the piston part 23 of the drive device.

The invention also relates to an apparatus for feeding material into a shaping device in a pneumatic materials conveying system, which apparatus comprises a feeder channel 3 for feeding material, such as waste material, into a shaping device 1, and/or through it, by the aid of at least partly gravity and at least partly suction and/or a pressure difference, which shaping device 1 is a rotary shaper, with which the material is processed so as to be denser and is conveyed onwards. A movable arresting means 21 is arranged before the rotary shaper 1 in the material infeed, direction, that the arresting means has a first position, in which it extends into the feeder channel 3, in which first position the arresting means 21 receives at least some of the force effect produced by the material w in the feeder channel 3, and that the transfer of the material w in the feeder channel 3 towards the rotary shaper 1 is limited, if necessary, with the arresting means 21, and that the arresting means 21 has a second position, in which the arresting means 21 does not extend into the feeder channel 3, and that the apparatus comprises a drive device 22 for the arresting means for moving the arresting means between the first and the second, position.

According to one embodiment the transverse surface area of the arresting means 21 covers some of the transverse surface area of the feeder channel 3 in the material infeed direction.

According to one embodiment the arresting means 21 is an elongated rod-shaped means.

According to one embodiment the drive device 22 of the arresting means is a pressure-medium-acting cylinder-piston combination, with the piston part 23 of which the arresting means 21 is configured to be moved.

According to one embodiment at least some of the handling means 10A, 10C of the rotary shaper are configured to feed the material w to be handled through the handling means when rotating them in a first direction with the drive device 7, in which case the arresting means 21 is configured to be in the first position in the feeder channel 3.

According to one embodiment the arresting means 21 is in the first position configured to limit the amount of material being fed to the rotary shaper 1.

According to one embodiment the direction of rotation of the rotatable handling means 10A, 10C is configured to be changeable, in which case when rotating at least some of the handling means 10A, 10C in the second direction, the arresting means 21 is configured to be in a second position, in which it does not extend into the feeder channel 3.

According to one embodiment the arresting means 21 is configured to be movable between a first position and a second position according to the operating sequences of the rotary shaper 1.

Typically the material is waste material, such as waste material arranged in bags. A refuse chute can be configured to be a part of a pneumatic waste conveying system or it can be a separate part, in which waste material is conducted into a waste room, waste tank or corresponding.

It is obvious to the person skilled in the art that the invention is not limited to the embodiments presented above, but that it can be varied within the scope of the claims presented below. The characteristic features possibly presented in the description in conjunction with other characteristic features can if necessary be used separately to each other.

The invention claimed is:

1. A method for feeding material into a shaping device in a pneumatic materials conveying system, comprising:
   - feeding material into a feeder channel by the aid of at least partly gravity and at least partly suction and/or a pressure difference,
   - feeding material from the feeder channel into and through a rotary shaping device to make the material denser after being compacted in the shaping device as compared to prior to entering the shaping device,
   - feeding material from the shaping device into a conveying pipe,
   - providing a movable arresting means for selectively engaging the material in the feeder channel, the movable arresting means being arranged in a material infeed direction before the rotary shaper,
   - moving the movable arresting means between a first position wherein the movable arresting means extends into the feeder channel and in which first position the arresting means receives at least some of the force effect produced by the material in the feeder channel, and
   - moving the movable arresting means to a second position wherein the arresting means does not extend into the feeder channel.

2. The method according to claim 1, wherein the arresting means is moved between the first position and the second position with a drive device.

3. The method according to claim 1, wherein a plurality of handling means of the rotary shaper feed the material to be handled through the plurality of handling means when rotating the plurality of handling means in a first direction with a drive device, wherein the arresting means is in the first position in the feeder channel.

4. The method according to claim 1, wherein with the arresting means in the first position the amount of material to be fed to the rotary shaper is limited.

5. The method according to claim 1, wherein a direction of rotation of a plurality of rotatable handling means can be varied wherein when rotating at least some of the plurality of handling means in a second direction, the arresting means is taken into a second position wherein the arresting means does not extend into the feeder channel.

6. The method according to claim 1, wherein a transverse surface area of the arresting means covers some of a transverse surface area of the feeder channel in the material infeed direction.

7. The method according to claim 1, wherein the arresting means is an elongated rod-shaped means.

8. The method according to claim 1, wherein a pneumatic materials handling system is a pipe transport system for waste material.

9. The method according to claim 1, wherein a plurality of rotatable handling means are driven in sequences wherein the handling means are rotated in a first direction for a first period of time ($t_1$) and thereafter in an opposite direction for a second period of time ($t_2$) wherein the arresting means is in the first position when the plurality of rotatable handling means are rotated in the first direction and the arresting means is in the second position when the plurality of rotatable handling means are rotated in the opposite direction.

10. The method according to claim 1, wherein the arresting means is moved with a drive device, which is a pressure-medium-acting cylinder-piston combination wherein the arresting means is moved with a piston of the drive device.

11. Apparatus for feeding material into a shaping device in a pneumatic materials conveying system, which apparatus comprises:
   - a feeder channel for feeding material, by the aid of at least partly gravity and at least partly suction and/or a pressure difference,
   - a rotary shaper for receiving the material from the feeder channel, said rotary shaper compacting the material wherein the material is denser after being compacted in the shaping device as compared to prior to entering the rotary shaper,
   - a movable arresting means arranged before the rotary shaper in a material infeed direction, said movable arresting means having a first position wherein the movable arresting means extends into the feeder channel wherein in the first position the arresting means receives at least some of a force effect produced by the material in the feeder channel, and wherein the transfer of the material in the feeder channel towards the rotary shaper is limited by the arresting means, and said movable arresting means having a second position wherein the arresting means does not extend into the feeder channel, and
   - a drive device operatively connected to the movable arresting means for moving the movable arresting means between the first and the second position.

12. The apparatus according to claim 11, wherein a transverse surface area of the arresting means covers some of a transverse surface area of the feeder channel in the material infeed direction.

13. The apparatus according to claim 11, wherein the arresting means is an elongated rod-shaped means.

14. The apparatus according to claim 11, wherein the drive device for the arresting means is a pressure-medium-acting cylinder-piston combination, with a piston operatively connected to move the arresting means.

15. The apparatus according to claim 11, wherein a plurality of handling means of the rotary shaper are configured to feed the material to be handled through the plurality of handling means when rotating the plurality of handling means in a first direction with the drive device wherein the arresting means is configured to be in the first position in the feeder channel.

16. The apparatus according to claim 11, wherein the arresting means in the first position is configured to limit the amount of material being fed to the rotary shaper.

17. The apparatus according to claim 11, wherein a direction of rotation of a plurality of rotatable handling means is configured to be changeable wherein when rotating at least some of the plurality of handling means in a second direction, the arresting means is configured to be in a second position, wherein the arresting means does not extend into the feeder channel.

18. The apparatus according to claim 11, wherein the arresting means is configured to be movable between the first position and the second position according to an operating sequences of the rotary shaper.

19. The method according to claim 2, wherein a plurality of handling means of the rotary shaper feed the material to be handled through the plurality of handling means when rotating the plurality of handling means in a first direction with a drive device wherein the arresting means is in the first position in the feeder channel.

20. The method according to claim 2, wherein with the arresting means in the first position the amount of material to be fed to the rotary shaper is limited.

* * * * *